United States Patent [19]

Tanaka et al.

[11] Patent Number: 4,801,491
[45] Date of Patent: Jan. 31, 1989

[54] WATER-RESISTANT AND HIGH-STRENGTH LAMINATE

[75] Inventors: Toshikiyo Tanaka, Ohtsu; Ichiro Yoshida, Osaka; Hiroshi Yasuda, Ohtsu, all of Japan

[73] Assignee: Toyo Boseki Kabushiki Kaisha, Japan

[21] Appl. No.: 183,994

[22] Filed: Apr. 20, 1988

[30] Foreign Application Priority Data

Apr. 25, 1987 [JP] Japan ................................ 62-102616

[51] Int. Cl.$^4$ ............................................. B32B 7/00
[52] U.S. Cl. .................................... 428/212; 428/259; 428/265; 428/336; 428/340; 428/902
[58] Field of Search ............... 428/212, 259, 265, 336, 428/340, 902

[56] References Cited

U.S. PATENT DOCUMENTS 4,590,121 5/1986 Mahr .................................... 428/259

Primary Examiner—Marion C. McCamish
Attorney, Agent, or Firm—Wegner & Bretschneider

[57] ABSTRACT

A water-resistant and high-strength laminate which comprises a base cloth of woven or knitted cloth obtained by weaving or knitting warps and wefts wherein at least a portion of warps and/or wefts is ultra-high-strength-polyethylene filaments and a majority of the rest is polyester fibers, at least one surface of said base cloth being laminated with a biaxially oriented polyester film through an adhesive layer.

7 Claims, No Drawings

WATER-RESISTANT AND HIGH-STRENGTH LAMINATE

FIELD OF THE INVENTION

The present invention relates to a laminate having excellent resistance to water, resistance to light and the like as well as lightness in weight and high strength. More particularly, the present invention relates to a water-resistant and high-strength laminate useful as cloth which is exposed to severe service conditions in the water area such as sailcloth for board sailing and the like. Although the laminate of the present invention is not limited to a specific use, the present invention is illustrated hereinafter by taking up sailcloth for board sailing as a main example thereof.

BACKGROUND OF THE INVENTION

Hitherto, as sailcloths for board sailing, there have been used cloths obtained by treating woven cloths having high density made of polymer materials such as polyester, polyamide and the like with calendering, by treating such cloths with a melanine resin, by coating such cloths with a soft polymer mainly composed of a vinyl chloride resin or by laminating such cloths with a polyester film or the like; cloths made of wholly aromatic fibers such as Aramid ® fibers; and the like.

Recently, sailcloth having lightness in weight, high strength and high transparency has been requested. However, cloth which meets all these requirements has not been realized.

That is, cloths obtained by treating the above woven cloths having high density with calendering have a defect that cloths themselves are liable to be thick and heavy. In addition, they have insufficient creep resistance. On the other hand, cloths obtained by treating the above woven base cloths with a melanine resin, by coating the base cloths with a soft polymer mainly composed of a vinyl chloride resin, or by laminating the base cloths with a polyester film or the like are expected to have improved creep resistance in some degree. However, they do not have sufficiently improved lightness in weight, high strength and transparency.

Further, in the case of sailcloth made of the above Aramid ® fibers which have high strength and high modulus, cloth having high strength can be obtained. However, lightening in weight thereof is insufficient. Furthermore, there is a problem that a colorful product can not be provided because of its poor resistance to light and lack of dyeability.

OBJECT OF THE INVENTION

The main object of the present invention is to provide a water-resistant and high-strength laminate which has properties requested for sailcloth for board sailing such as high strength, high modulus, transparency, lightness in weight, good handling, and excellent resistance to light.

This object as well as other objects and advantages of the present invention will become apparent to those skilled in the art from the following description.

SUMMARY OF THE INVENTION

According to the present invention, there is provided a water-resistant and high-strength laminate which comprises a base cloth of woven or knitted cloth obtained by weaving or knitting warps and wefts wherein at least a portion of warps and/or wefts is ultra-high-strength-polyethylene filaments and a majority of the rest is polyester fibers, at least one surface of said base cloth being laminated with a biaxially oriented polyester film through an adhesive layer.

The laminate of the present invention has excellent resistance to water and resistance to light as well as lightness in weight and high strength suitable for sailcloth for board sailing or the like. Particularly, the laminate of the present invention has excellent tearing strength together with high strength in which adhesion strength between the base cloth part and the film part is high. In addition, the laminate of the present invention has excellent transparency.

Since the laminate of the present invention has excellent transparency, it can be used as sailcloth without see-through window processing.

DETAILED DESCRIPTION OF THE INVENTION

Warps and wefts which constitute the base cloth of the laminate of the present invention are composed of ultra-high-strength-polyethylene filaments fiber (referred as to KKS hereinafter) yarns and/or polyester fiber yarns and, optionally, third fiber yarns such as polyamide fibers and the like. Accordingly, representative aspects of the base cloth are, for example, being woven or knitted with warps or wefts composed of only KKS, and wefts or warps composed of only polyester fiber; being woven or knitted with yarns using warps and wefts composed of both KKS and polyester fibers; being woven or knitted with warps and wefts wherein either warps or wefts are composed only KKS or polyesters fibers and the others are composed of both KKS and polyester fibers as described above. And third fiber yarns can be combined as a portion of warps and wefts, if necessary.

It is desirable that the unit fineness of fibers which constitute warps and/or wefts in the present invention is 0.5 to 20 denier, preferably 1 to 10 denier. When it is less than 0.5 denier, the yarn as an aggregate of fibers is too soft and handling properties in the production steps are deteriorated. Further, the base cloth and, therefore, the laminate produced therefrom also become too soft. On the other hand, when it is greater than 20 denier, the yarn becomes too hard, and softness of the base cloth and, therefore, that of the laminate obtained therefrom are decreased. It is also desirable that total denier as the warps and/or wefts is 50 to 800 denier, preferably, 100 to 300 denier. When it is less than 50 denier, strength of the yarn is too low and, therefore, sufficient tearing strength as well as bias elongation can not be obtained. When it is greater than 800 denier, on the other hand, the yarn is too thick and the base cloth and, therefore, the laminate obtained therefrom become thick and heavy. In addition, since twisting of warps and/or wefts leads to lowering of strength, it is desirable that the yarns are substantially non-twisted. The term "substantially non-twisted" used herein means that the number of twist is 0 to 100 times/m, preferably, 0 to 20 times/m. When the number of twist is greater than 100 times/m, strength is lowered. At the same time, the cross section of fibers becomes circular and the degree of concaveness and convexness over the surface of woven or knitted cloth is raised. Thereby, when the cloth is laminated with the film, they contact with each other only at points of the convex parts, which results in deterioration of adhesion properties.

It is also desired that tensile strength of the warps and/or wefts is not less than 15 g/denier, preferably, not less than 20 g/denier, more preferably not less than 30 g/denier. When it is less than 15 g/denier, sufficiently improved tearing strength can not be expected. Particularly, the sailcloth for board sailing receives tearing force in the longitudinal direction, it is advantageous to use yarns having sufficient tensile strength as warps for the above sailcloth. And, it is necessary to use KKS as the main ingredient which greatly contributes to improvement of strength to provide the above tensile strength to warps or wefts. Although yarns composed of 100% KKS are most preferred in view of improvement of tensile strength, polyester fibers and, if necessary, polyamide fibers may be used in addition to KKS. In this case, the volume content of KKS is preferably not less than 50%, more preferably, not less than 80%.

By the way, when all the above warps and wefts are composed of KKS, adhesion strength to the biaxially oriented polyester film can not be sufficiently increased. That is, in order to obtain sufficiently increased adhesion strength to the biaxially oriented polyester film, it is necessary to use polyester fibers as all of or at least a portion of either warps or wefts. Accordingly, in view of improvement of tensile strength, it is recommended that the volume content of KKS is preferably not less than 50%. However, in view of improvement of adhesion strength between the base cloth and the film, it is desired that the volume content of polyester fibers is increased to a degree of around 50%. Therefore, it is necessary to select constituent materials of warps and wefts by taking both volume contents into consideration. In addition, the polyester fibers may include PET fibers and copolymer fibers in which PET ingredient is not less than 90 molar%. And, additives such as weathering agents, coloring agents, antioxidants, heat stabilizers, inorganic particles and the like may be added to the polyester fibers.

In general, KKS has inferior dyeability. However, the base cloth used in the present invention contains a considerable amount of the polyester fibers or the like as described above and, therefore, the base cloth has good dyeability to obtain distinct and fast dyeing. That is, in view of improvement of dyeability, it is also necessary that warps and/or wefts contain a considerable amount of the polyester fibers and, thereby, the colorful laminate can be obtained. In addition, this makes it easy to provide patterns and/or letters on the surface of the base cloth as well as on the surface of the film as described hereinafter by a printing or mounting method or the like.

As the arrangement of warps or wefts, the yarns composed of KKS and the yarns composed of polyester fibers can be arranged one after the other in every constant numbers. In this case, it is desired that average tensile strength of the warps or the wefts is at least not less than 15 g/denier. When the yarns composed of KKS and the yarns composed of polyester fibers or the like are arranged at constant intervals, by carrying out weaving or knitting in such a manner that yarns made of KKS are present at intervals of at least 5 cm, preferably, of 2 to 2.5 cm, tearing resistance can be effectively increased because tearing ceases at the yarn composed of KKS, even if tearing occurs.

It is desired that the weight of the base cloth thus woven or knitted is 20 to 250 g/m$^2$, more preferably, 30 to 150 g/m$^2$. When it is less than 20 g/m$^2$, there are defects such that tearing strength is low and bias elongation is great. When it is greater than 250 g/m$^2$, on the other hand, the laminate becomes excessively hard and sewing workability and handling properties are deteriorated.

In the present invention, the manner of weaving is not specifically limited and the cloth may be plain weave, twill weave, satin weave and the like. Likewise, the manner of knitting is not specifically limited. And, optionally, the base cloth can be subjected to a known finishing treatment such as water repellent finishing, crease resistant finishing or the like.

The laminate of the present invention is obtained by adhering and laminating the biaxially oriented polyester film on at least one surface of the base cloth obtained by weaving or knitting with warps and wefts as described above. The biaxially oriented polyester film is that composed of a polyester such as polyethyleneterephthalate (hereinafter referred to as PET), polyethylenenaphthalate, polybutyleneterephthalate and copolymers thereof and the like. Preferably, the biaxially oriented film is composed of PET or a copolymer in which PET ingredient is not less than 90 molar%. Preferably, the thickness of the biaxially oriented film is 12 to 125 $\mu$m, more preferably, 20 to 100 $\mu$m. When it is less than 12 $\mu$m, tearing strength of the laminate is lowered and elongation toward the bias direction becomes great. When it is greater than 125 $\mu$m, on the other hand, the laminate becomes thick and too heavy. It is desired that strength of the biaxially oriented film is not less than 15 kg/mm$^2$ in all directions, preferably, not less than 18 kg/mm$^2$. When it is less than 15 kg/mm$^2$, resistance to tearing stress is lowered. Further, although it is preferable that the biaxially oriented film is a colorless transparent or dyed transparent film, the film may be an opaque colored film containing inorganic particles. As the inorganic particles, there can be used oxides, sulfides, sulfates, carbon black and the like which have an average particle size of 10 $\mu$m to 5 $\mu$m. Examples thereof include titanium dioxide, calcium carbonate, zinc sulfide, ultramarine, cobalt blue, barium sulfate, talc and the like. Favorite colors can be obtained by dyeing with a disperse dye. It is desirable that the surface of the biaxially oriented film to be bonded to the cloth is subjected to treatment with corona discharge, plasma, prime coat or the like. These treatments can improve adhesion strength to the base cloth. Further, additives such as weathering agents, antioxidants and the like may be added to the biaxially oriented film.

Thickness of the adhesive layer which bonds the base cloth and the biaxially oriented polyester film is preferably 10 to 40 $\mu$m, and the adhesive layer can be provided for either or both surfaces of the base cloth and the biaxially oriented film by well known methods such as coating, extrusion laminating and the like. Such an adhesive can be selected appropriately from thermoplastic resins or thermosetting resins. Examples thereof include resinous adhesives of copolyesters, polyesterethers, polyacrylates, polymethacrylates, polyurethanes and the like. Particularly, it is preferred to use a thermoplastic resin containing copolyesters as a main ingredient or a thermosetting resin into which a crosslinkable ingredient such as isocyanate is formulated. Additives such as antioxidants and ultraviolet absorbing agents may be formulated into the adhesive.

A preferred embodiment of the production of the laminate of the present invention is illustrated below.

After high molecular weight polyethylene (for example, ultra-high-molecular-weight polyethylene having viscosity-average molecular weight of not less than $1\times10^5$, preferably, than $1\times10^6$) is dissolved thoroughly in a solvent such as decalin, xylene, paraffins or the like at a temperature lower than the boiling point of the solvent, and extruded into air at room temperature, water, or a hollow tube equipped with a cooling apparatus at a temperature where a polyethylene solution does not solidify in the spinning apparatus. The yarns obtained by extrusion contain the solvent therein and, with or without extracting the solvent and with preventing melting, they are heated and stretched by single or multi-stage stretching in the total stretching ratio of not less than 10, preferably, not less than 20. KKS thus obtained (monofilament denier: 1 denier; tensile strength: 35 g/denier) are combined at the number of twist of 0 into the warps of 150 denier (18 yarns/inch). Occasionally, a sizing agent such as modified PVA or the like is added to KKS to effect warping to obtain the warps. On the other hand, PET fibers obtained by a conventional method (monofilament denier: 1 denier) are combined at the number of twist of 0 to obtain the wefts of 250 denier (18 yarns/inch). And, plain weaving of the above warps and wefts can give the base cloth.

After one surface of the biaxially oriented PET film produced by a well known method (thickness; 50 μm) is treated by corona discharge, the film is overlaid with the above base cloth. And, an adhesive is pressed between the base cloth and the biaxially oriented PET film by a melt extrusion laminating method, and they are pressed and integrated by passing through nip rolls. If necessary, they are further passed through press rolls to adjust adhesion strength to obtain the laminate having the structure of the biaxially oriented PET film-the adhesive layer-the base cloth. Likewise, there can be obtain the laminate having the structure of, for example, (A) the biaxially oriented PET film-the adhesive layer-the base cloth-the adhesive layer-the biaxially oriented PET film, or (B) the base cloth-the adhesive layer-the biaxially oriented PET film-the adhesive layer-the base cloth.

In the above process, the temperature of the adhesive layer at heat-bonding (upon passing through press rolls) is preferably 110° to 180° C., particularly, 120° to 150° C., and the contact pressure of press rolls can be adjusted depending upon the impregnating degree of the adhesive into the base cloth. Usually, the pressure can be 1 to 30 kg/cm, preferably, 2 to 10 kg/cm.

The following Examples further illustrate the present invention in detail but are not to be construed to limit the scope thereof.

EXAMPLES 1 to 5

According to the same manner as described in the above preferred embodiment, laminates as shown in Table 1 were produced and their properties were evaluated. The results are shown in Table 2.

The measurement of each property was carried out as follows.
Tensile Strength and Tensile Elongation: JIS L 1096
Bias Elongation: Instron Type Tensile Machine
  Gauge length: 100 mm
  Sample width: 50 mm
  Elongation rate: 50 mm/min.
Tearing Strength: JIS L 1096
  Single tongue method
Adhesion Strength: dynamic load, 90° peel
Flexibility: Ring crush method
Water Absorption Properties: A tip of the laminate was dipped in blue ink. The wicking height after 24 hrs. was represented in mm.

In Table 2, there are also shown the difference in properties between twisted and non-twisted samples.

TABLE 1

| No. | Ex. 1 | Ex. 2 | Ex. 3 | Ex. 4 | Ex. 5 |
| --- | --- | --- | --- | --- | --- |
| Base cloth (woven cloth) | | | | | |
| Warp | | | | | |
| Material | KKS *1 | KKS *2 | PET *1 | Kevlar *1 | KKS *1 |
| Total denier | 300 | 300 | 300 | 400 | 300 |
| Constitution (yarns/inch) | 18 | 18 | 18 | 18 | 18 |
| Weft | | | | | |
| Material | PET *1 | PET *2 | PET *1 | Kevlar *1 | KKS *1 |
| Total denier | 250 | 250 | 250 | 200 | 150 |
| Constitution (yarns/inch) | 18 | 18 | 18 | 18 | 18 |
| Biaxially oriented PET film (one film) *3 | | | | | |
| Thickness (μm) | 12 | 12 | 12 | 12 | 12 |
| Adhesive (g/m$^2$) | | | | | |
| Isocyanate crosslinked dry laminate | 25 | 25 | 25 | 25 | 25 |
| Laminate | | | | | |
| Thickness (mm) | 0.16 | 0.18 | 0.15 | 0.14 | 0.16 |
| Weight (g/m$^2$) | 131 | 133 | 130 | 135 | 123 |

*1: non-twisted,
*2: twisted,
*3: laminated on both surfaces

TABLE 2

| No. | | Ex. 1 | Ex. 2 | Ex. 3 | Ex. 4 | Ex. 5 |
| --- | --- | --- | --- | --- | --- | --- |
| Tensile strength (kg/5cm) | Warp direction | 298 | 294 | 79 | 285 | 295 |
| | Weft direction | 71 | 69 | 66 | 140 | 145 |
| Tensile Elongation (%) | Warp direction | 5.4 | 6.1 | 12.4 | 3.0 | 4.0 |
| | Weft direction | 13.5 | 13.7 | 20.5 | 3.2 | 4.4 |
| Bias elongation in 45° direction (%) | Load 20 (lbs) | 1.2 | 1.2 | 1 | 1 | 1 |
| | 40 | 7.3 | 7.3 | 8 | 5 | 6 |
| | 60 | 20.9 | 21.1 | 23 | 18 | 20 |
| | 80 | 30.0 | 31.3 | 34 | 28 | 30 |
| | 100 | 35.8 | 36.5 | 42 | 37 | 39 |
| Tearing strength (kg) | Warp direction | 3.3 | 3.3 | 3.3 | 6.3 | 6.5 |
| | Weft direction | ≧7 * | ≧7 * | 3.6 | 7.3 | 7.9 |
| Adhesion strength (kg/inch) | Back | ≧4 ** | ≧4 ** | ≧4 ** | ≧4 ** | 3.0 |
| | Face | ≧4 ** | ≧4 ** | ≧4 ** | ≧4 ** | 3.0 |
| Flexibility (kg) | Warp direction | 4.4 | 4.2 | 4.4 | 4.6 | 4.5 |
| | Weft direction | 5.6 | 5.4 | 5.4 | 5.7 | 5.6 |
| Water absorption properties (mm) | Warp direction | 11 | 12 | 0 | 0 | 12 |
| | Weft direction | 0 | 0 | 0 | 0 | 0 |

TABLE 2-continued

| | No. | | Ex. 1 | Ex. 2 | Ex. 3 | Ex. 4 | Ex. 5 |
|---|---|---|---|---|---|---|---|
| Resistance to light | Tensile strength (kg/5cm) | Warp direction | 148 | 148 | 40 | 43 | 148 |
| | | Weft direction | 33 | 33 | 33 | 20 | 74 |
| | Tearing strength (kg) | Warp direction | 0.9 | 0.9 | 0.9 | 0.9 | 2.9 |
| | | Weft direction | 3.6 | 3.6 | 1.0 | 0.6 | 3.6 |
| Flex fatigue tensile strength (kg/5cm) | | Warp direction | 292 | 293 | 75 | 50 | 293 |
| | | Weft direction | 62 | 63 | 63 | 23 | 143 |
| Tint | | | | | white | yellowish brown | white |

In Table 2, the asterisks represent following:

*: Since strength of the wefts was remarkably lower than that of the warps, rip occurred along the warp direction. Therefore, accurate measurements of the warp direction could not be conducted.

**: Since adhesion strength was higher than breaking strength of the film, it was broken before peeling. Therefore, accurate measurements could not be conducted.

In Tables 1 and 2, the laminate of Example 3 (Comparative Example) in which both warps and wefts are composed of PET has low tensile strength and, at the same time, insufficient tearing strength, particularly, that along the weft direction. In the laminate of Example 4 (Comparative Example) in which both warps and wefts are composed of Kevlar (tradename of Aramid ®) fibers), tensile strength and tearing strength are lowered after it is exposed to light. Further, the laminate is inferior in flex fatigue properties and tint thereof becomes yellowish brown with lacking transparency. The laminate of Example 5 (Comparative Example) in which both warps and wefts are composed of KKS is inferior in adhesion strength. To the contrary, the laminate of Example 1 which meets the equirements of the present invention has excellent values for each property and is good in resistance to light, flex fatigue and tint. In the laminate of Example 2, the warps and wefts are twisted at 100 times/m, while those of Example 1 are not twisted. Thus, adhesion strength of the laminate of Example 2 is somewhat lowered.

EXAMPLES 6 to 9

According to the same manner as described above, various laminates as shown in Table 3 were produced by modifying unit denier of the laminate of Example 1 and properties thereof were compared with those of the laminate of Example 1. The results are shown in Table 4.

TABLE 3

| No. | Ex. 1 | Ex. 6 | Ex. 7 | Ex. 8 | Ex. 9 |
|---|---|---|---|---|---|
| base cloth (woven cloth) | | | | | |
| Material* | KKS | KKS | KKS | KKS | KKS |
| Total denier | 300 | 300 | 300 | 300 | 300 |
| Warp Constitution (yarns/inch) | 18 | 18 | 18 | 18 | 18 |
| Monofilament denier | 1 | 0.5 | 10 | 25 | 20 |
| Material *1 | PET | PET | PET | PET | PET |
| Weft Total denier | 250 | 250 | 250 | 250 | 250 |
| Constitution (yarns/inch) | 18 | 18 | 18 | 18 | 18 |
| Monofilament denier | 1 | 0.5 | 10 | 25 | 1 |
| Biaxially oriented PET film (one film) *3 | | | | | |
| Thickness (μm) | 12 | 12 | 12 | 12 | 12 |
| Adhesive (g/m²) | | | | | |
| Isocyanate crosslinked dry laminate | 25 | 25 | 25 | 25 | 25 |
| Laminate | | | | | |
| Thickness (mm) | 0.16 | 0.15 | 0.17 | 0.19 | 0.18 |
| Weight (g/m²) | 131 | 131 | 131 | 131 | 131 |

*1: non-twisted
*3: laminated on both surfaces

TABLE 4

| | No. | | Ex. 1 | Ex. 6 | Ex. 7 | Ex. 8 | Ex. 9 |
|---|---|---|---|---|---|---|---|
| Tensile strength (kg/5cm) | Warp direction | | 298 | 299 | 296 | 294 | 294 |
| | Weft direction | | 71 | 73 | 69 | 66 | 71 |
| Tensile elongation (%) | Warp direction | | 5.4 | 5.3 | 5.6 | 5.8 | 5.8 |
| | Weft direction | | 13.5 | 13.3 | 13.8 | 13.8 | 13.5 |
| Bias elongation in 45° direction (%) | Load (lbs) | 20 | 1.2 | 1.2 | 1.2 | 1.2 | 1.2 |
| | | 40 | 7.3 | 7.2 | 7.3 | 7.3 | 7.2 |
| | | 60 | 20.9 | 20.9 | 21.0 | 21.0 | 20.9 |
| | | 80 | 30.0 | 30.0 | 31.0 | 31.1 | 30.6 |
| | | 100 | 35.8 | 35.6 | 36.5 | 36.6 | 36.2 |
| Tearing strength (kg) | Warp direction | | 3.3 | 3.4 | 3.2 | 3.1 | 3.3 |
| | Weft direction | | ≧7 * | ≧7 * | ≧7 * | ≧7 * | ≧7 * |
| Adhesion strength (kg/inch) | Back | | ≧4 ** | ≧4 ** | ≧4 ** | ≧4 ** | ≧4 ** |
| | Face | | ≧4 ** | ≧4 ** | ≧4 ** | ≧4 ** | ≧4 ** |
| Flexibility (kg) | Warp direction | | 4.4 | 2.5 | 4.8 | 5.2 | 5.2 |
| | Weft direction | | 5.6 | 2.8 | 6.0 | 6.5 | 5.6 |
| Water absorption properties (mm) | Warp direction | | 11 | 13 | 11 | 15 | 11 |
| | Weft direction | | 0 | 0 | 0 | 0 | 0 |
| Sewing workability | | | good | good | good | difficult to be handled because | difficult to be handled because |

TABLE 4-continued

| No. | Ex. 1 | Ex. 6 | Ex. 7 | Ex. 8 | Ex. 9 |
|---|---|---|---|---|---|
| Handling properties of the laminate (controllability of sailing) | good | inferior because of excessive flexibleness | good | of non-flexibleness non-flexibleness | of non-flexibleness non-flexibleness |

* and **: The same as those in Table 2.

As shown in Tables 3 and 4, when the monofilament denier becomes smaller, the laminate becomes more flexible (Example 6) and, in the case that the laminate is too flexible, it is not suitable for sailcloth. On the other hand, when the monofilament denier of either of the warps or the wefts, or both of them becomes thicker (Examples 8 and 9), the laminate becomes more hard and, in the case that the laminate is too hard, sewing workability and controllability of sailing are deteriorated. The laminates of Examples 1 and 6 have suitable monofilament denier.

EXAMPLES 10 to 15

According to the same manner as described above, various laminates as shown in Table 5 were produced by modifying total denier and thread count (constitution). Properties thereof were compared with those of the laminate of Example 1. The results are shown in Table 6.

TABLE 5

| No. | Ex. 1 | Ex. 10 | Ex. 11 | Ex. 12 | Ex. 13 | Ex. 14 | Ex. 15 |
|---|---|---|---|---|---|---|---|
| Base cloth (woven cloth) | | | | | | | |
| Warp | | | | | | | |
| Material *1 | KKS | KKS | KKS | KKS | KKS | KKS | KKS |
| Total denier | 300 | 30 | 30 | 50 | 150 | 800 | 1000 |
| Constitution (yarns/inch) | 18 | 18 | 35 | 18 | 18 | 18 | 18 |
| Weft | | | | | | | |
| Material *1 | PET | PET | PET | PET | PET | PET | PET |
| Total denier | 250 | 30 | 30 | 50 | 150 | 800 | 1000 |
| Constitution (yarns/inch) | 18 | 18 | 35 | 18 | 18 | 18 | 18 |
| Biaxially oriented PET film (one film) *3 | | | | | | | |
| Thickness ($\mu$m) | 12 | 12 | 12 | 12 | 12 | 12 | 12 |
| Adhesive (g/m$^2$) | | | | | | | |
| Isocyanate crosslinked dry laminate | 25 | 25 | 25 | 25 | 25 | 25 | 25 |
| Laminate | | | | | | | |
| Thickness (mm) | 0.16 | 0.10 | 0.12 | 0.11 | 0.14 | 0.27 | 0.31 |
| Weight (g/m$^2$) | 131 | 79 | 86 | 83.6 | 99.5 | 228 | 266 |

*1: non-twisted
*3: laminated on both surfaces

TABLE 6

| No. | | Ex. 1 | Ex. 10 | Ex. 11 | Ex. 12 | Ex. 13 | Ex. 14 | Ex. 15 |
|---|---|---|---|---|---|---|---|---|
| Tensile strength (kg/5cm) | Warp direction | 298 | 29.1 | 58.2 | 49.8 | 150 | 795 | 992 |
| | Weft direction | 71 | 8.5 | 17.0 | 14.2 | 42.5 | 227 | 284 |
| Tensile elongation (%) | Warp direction | 5.4 | 5.4 | 5.4 | 5.4 | 5.4 | 5.4 | 5.5 |
| | Weft direction | 13.5 | 13.5 | 13.5 | 13.5 | 13.4 | 13.5 | 13.5 |
| Bias elongation in 45° direction (%) | Load 20 (lbs) | 1.2 | 60.2 | 35.5 | 35.7 | 1.5 | 0.1 | 0.1 |
| | 40 | 7.3 | — | — | — | 8.5 | 0.4 | 0.4 |
| | 60 | 20.9 | — | — | — | 24.0 | 1.2 | 1.2 |
| | 80 | 30.0 | — | — | — | 35.8 | 5.1 | 3.8 |
| | 100 | 35.8 | — | — | — | 42.1 | 14.3 | 10.2 |
| Tearing strength (kg) | Warp direction | 3.3 | 0.40 | 0.44 | 0.60 | 2.0 | 11.2 | 13.5 |
| | Weft direction | ≧7 * | 2.6 | 2.65 | 4.0 | ≧7 * | ≧7 * | ≧7 * |
| Adhesion strength (kg/inch) | Back | ≧4 ** | ≧4 ** | ≧4 ** | ≧4 ** | ≧4 ** | ≧4 ** | ≧4 ** |
| | Face | ≧4 ** | ≧4 ** | ≧4 ** | ≧4 ** | ≧4 ** | ≧4 ** | ≧4 ** |
| Flexibility (kg) | Warp direction | 4.4 | 0.4 | 0.9 | 0.8 | 3.0 | 8.9 | 12.5 |
| | Weft direction | 5.6 | 0.5 | 1.0 | 0.85 | 3.2 | 9.7 | 13.8 |
| Water absorption properties (mm) | Warp direction | 11 | 0 | 0 | 0 | 4 | 12 | 15 |
| | Weft direction | 0 | 0 | 0 | 0 | 0 | 1 | 3 |
| Weight of the woven cloth (g/m$^2$) | | 55 | 5.8 | 12.0 | 9.6 | 25.6 | 154 | 192 |

* and **: The same as those in Table 2.

As shown in Tables 5 and 6, when the total denier becomes smaller (Examples 10 and 11), the yarn strength becomes lower and, in the case that the yarn strength is too low, it is difficult to obtain sufficient tearing strength. On the other hand, when the total denier becomes larger (Example 15), the laminate becomes heavy and thick and, in the case that the laminate becomes extremely heavy and thick, flexibility is lost.

EXAMPLES 16 to 20

According to the same manner as described above, various laminates as shown in Table 7 were produced by changing the weight of each laminate. Properties thereof were compared with those of Examples 1, 13 and 14. The results are shown in Table 8.

too low, tearing strength becomes insufficient. On the other hand, the weight becomes higher, the laminate becomes heavy and thick and, in the case that the laminate is too heavy and thick, flexibility is lost. Each laminate of Examples 13, 1, 18 and 14 has appropriate weight.

EXAMPLES 21 to 25

According to the same manner as described above, various laminates as shown in Table 9 were produced

TABLE 7

| No. | Ex. 16 | Ex. 17 | Ex. 13 | Ex. 1 | Ex. 18 | Ex. 14 | Ex. 19 | Ex. 20 |
|---|---|---|---|---|---|---|---|---|
| Base cloth (woven cloth) | | | | | | | | |
| Warp | | | | | | | | |
| Material *1 | KKS | KKS | KKS | KKS | KKS | KKS | KKS | KKS |
| Total denier | 100 | 100 | 150 | 300 | 300 | 800 | 600 | 1200 |
| Constitution (yarns/inch) | 14 | 20 | 18 | 18 | 18 | 18 | 36 | 22 |
| Weft | | | | | | | | |
| Material *1 | PET | PET | PET | PET | PET | PET | PET | PET |
| Total denier | 100 | 100 | 150 | 250 | 300 | 800 | 600 | 1200 |
| Constitution (yarns/inch) | 14 | 20 | 18 | 18 | 18 | 18 | 36 | 22 |
| Weight (g/m$^2$) | 14.8 | 21.0 | 25.6 | 55 | 57.6 | 154 | 230 | 282 |
| Biaxially oriented PET film (one film) *3 | | | | | | | | |
| Thickness (μm) | 12 | 12 | 12 | 12 | 12 | 12 | 12 | 12 |
| Adhesive (g/m$^2$) | | | | | | | | |
| Isocyanate crosslinked dry laminate | 25 | 25 | 25 | 25 | 25 | 25 | 25 | 25 |
| Laminate | | | | | | | | |
| Thickness (mm) | 0.11 | 0.12 | 0.14 | 0.16 | 0.16 | 0.27 | 0.31 | 0.40 |
| Weight (g/m$^2$) | 89 | 95 | 99.5 | 131 | 133 | 228 | 266 | 356 |

*1: non-twisted
*3: laminated on both surfaces

TABLE 8

| No. | | Ex. 16 | Ex. 17 | Ex. 13 | Ex. 1 | Ex. 18 | Ex. 14 | Ex. 19 | Ex. 20 |
|---|---|---|---|---|---|---|---|---|---|
| Tensile strength (kg/5cm) | Warp direction | 99 | 141 | 150 | 298 | 298 | 795 | 1192 | 1459 |
| | Weft direction | 28.5 | 40.9 | 42.5 | 71 | 85 | 227 | 340 | 414 |
| Tensile elongation (%) | Warp direction | 5.4 | 5.4 | 5.4 | 5.4 | 5.4 | 5.4 | 5.4 | 5.4 |
| | Weft direction | 13.5 | 13.5 | 13.5 | 13.5 | 13.5 | 13.5 | 13.5 | 13.5 |
| Bias elongation in 45° direction (%) | Load (lbs) 20 | 1.8 | 1.6 | 1.5 | 1.2 | 1.2 | 0.1 | 0.1 | 0.0 |
| | 40 | 9.5 | 9.0 | 8.5 | 7.3 | 7.3 | 0.4 | 0.4 | 0.1 |
| | 60 | 25.6 | 24.6 | 24.0 | 20.9 | 20.8 | 1.2 | 1.2 | 0.4 |
| | 80 | 37 | 36.4 | 35.8 | 30.0 | 29.8 | 5.1 | 3.6 | 1.3 |
| | 100 | 51 | 44.3 | 42.1 | 35.8 | 34.9 | 14.3 | 9.8 | 3.8 |
| Tearing strength (kg) | Warp direction | 1.2 | 1.9 | 2.0 | 3.3 | 3.3 | 11.2 | 14.5 | 15.2 |
| | Weft direction | 3 | 3 | 3.5 | ≧7 * | ≧7 * | ≧7 * | ≧7 * | ≧7 * |
| Adhesion strength (kg/inch) | Back | ≧4 ** | ≧4 ** | ≧4 ** | ≧4 ** | ≧4 ** | ≧4 ** | ≧4 ** | ≧4 ** |
| | Face | ≧4 ** | ≧4 ** | ≧4 ** | ≧4 ** | ≧4 ** | ≧4 ** | ≧4 ** | ≧4 ** |
| Flexibility (kg) | Warp direction | 2.0 | 2.8 | 3.0 | 4.4 | 4.4 | 8.9 | 13.7 | 14.5 |
| | Weft direction | 2.1 | 3.0 | 3.2 | 5.6 | 5.8 | 9.7 | 14.4 | 15.8 |
| Water absorption properties (mm) | Warp direction | 0 | 0 | 4 | 11 | 11 | 12 | 12 | 15 |
| | Weft direction | 0 | 0 | 0 | 0 | 0 | 1 | 1 | 3 |

* and **: The same as those in Table 2.

As shown in Tables 7 and 8, when the weight becomes lower (Examples 16 and 17), strength of the laminate becomes low and, in the case that strength is by modifying thickness of the biaxially oriented PET film. Properties thereof were compared with those of Example 18. The results are shown in Table 10.

TABLE 9

| No. | Ex. 21 | Ex. 18 | Ex. 22 | Ex. 23 | Ex. 24 | Ex. 25 |
|---|---|---|---|---|---|---|
| Base cloth (woven cloth) | | | | | | |
| Warp | | | | | | |
| Material *1 | KKS | KKS | KKS | KKS | KKS | KKS |
| Total denier | 300 | 300 | 300 | 300 | 300 | 300 |
| Constitution (yarns/inch) | 18 | 18 | 18 | 18 | 18 | 18 |
| Weft | | | | | | |
| Material *1 | PET | PET | PET | PET | PET | PET |
| Total denier | 300 | 300 | 300 | 300 | 300 | 300 |

TABLE 9-continued

| No. | Ex. 21 | Ex. 18 | Ex. 22 | Ex. 23 | Ex. 24 | Ex. 25 |
|---|---|---|---|---|---|---|
| Constitution (yarns/inch) | 18 | 18 | 18 | 18 | 18 | 18 |
| Weight (g/m²) | 57.6 | 57.6 | 57.6 | 57.6 | 57.6 | 57.6 |
| Biaxially oriented PET film (one film) | *3 | *3 | *3 | *3 | *3 | *6 |
| Thickness (μm) | 10 | 12 | 25 | 50 | 100 | 125 |
| Adhesive (g/m²) Isocyanate crosslinked dry laminate | 25 | 25 | 25 | 25 | 25 | 25 |
| Laminate | | | | | | |
| Thickness (mm) | 0.16 | 0.16 | 0.20 | 0.26 | 0.38 | 0.29 |
| Weight (g/m²) | 128 | 133 | 158 | 208 | 308 | 233 |

*1: non-twisted
*3: laminated on both surfaces
*6: laminated on one surface

TABLE 10

| No. | | Ex. 21 | Ex. 18 | Ex. 22 | Ex. 23 | Ex. 24 | Ex. 25 |
|---|---|---|---|---|---|---|---|
| Tensile strength (kg/5cm) | Warp direction | 298 | 298 | 298 | 298 | 298 | 298 |
| | Weft direction | 85 | 85 | 85 | 85 | 85 | 85 |
| Tensile elongation (%) | Warp direction | 5.4 | 5.4 | 5.4 | 5.4 | 5.4 | 5.4 |
| | Weft direction | 13.5 | 13.5 | 13.5 | 13.5 | 13.5 | 13.5 |
| Bias elongation in 45° direction (%) | Load (lbs) 20 | 2.5 | 1.2 | 1.0 | 1.0 | 0.5 | 1.0 |
| | 40 | 12.3 | 7.3 | 6.5 | 6.5 | 0.6 | 6.5 |
| | 60 | 30.8 | 20.8 | 17.2 | 15.8 | 0.9 | 15.7 |
| | 80 | 35.3 | 29.8 | 26.1 | 24.7 | 4.7 | 23.7 |
| | 100 | — | 34.9 | 30.3 | 28.9 | 9.2 | 27.6 |
| Tearing strength (kg) | Warp direction | 3.3 | 3.3 | 3.5 | 3.7 | 4.4 | 3.4 |
| | Weft direction | ≧7 * | ≧7 * | ≧7 * | ≧7 * | ≧7 * | ≧7 * |
| Adhesion strength (kg) | Back | ≧4 ** | ≧4 ** | 4.0 | 4.0 | 3.95 | 3.9 |
| | Face | ≧4 ** | ≧4 ** | 4.0 | 4.0 | 3.95 | 3.9 |
| Flexibility (kg) | Warp direction | 2.1 | 4.4 | 5.4 | 9.2 | 14.2 | 9.0 |
| | Weft direction | 3.4 | 5.8 | 6.7 | 10.1 | 15.7 | 98 |
| Water absorption properties (mm) | Warp direction | 11 | 11 | 11 | 11 | 11 | — |
| | Weft direction | 0 | 0 | 0 | 0 | 0 | — |

* and **: The same as those in Table 2.

As shown in Tables 9 and 10, when the thickness of the biaxially oriented PET film becomes thinner (Example 21), the laminate has relatively low tearing strength and particularly large bias direction elongation. Therefore, in the case that the thickness is too thin, it is readily elongated and deformed by applying of stress. On the other hand, when the thickness of the biaxially oriented PET film becomes larger (Example 25), the laminate is considerably thick and heavy, although the film is laminated on only one surface. It is considered that, in the case that the thickness is too large and the film is laminated on both surfaces, the resulting laminate can not be used for sailcloth.

EXAMPLES 26 to 29

According to the same manner as described above, various laminates as shown in Table 11 were produced by modifying the amount of the adhesive. Properties thereof were compared. The results are shown in Table 12. Further, properties of the laminate in which one KKS weft is used per two PET wefts (Example 18) are also shown in these Tables.

TABLE 11

| No. | Ex. 18 | Ex. 26 | Ex. 27 | Ex. 28 | Ex. 29 |
|---|---|---|---|---|---|
| Base cloth (woven cloth) | | | | | |
| Warp | | | | | |
| Material *1 | KKS | KKS | KKS | KKS | KKS |
| Total denier | 300 | 300 | 300 | 300 | 300 |
| Constitution (yarns/inch) | 18 | 18 | 18 | 18 | 18 |
| Weft | | | | | |
| Material *1 | PET | PET | PET | PET | PET:KKS = 2:1 |
| Total denier | 300 | 300 | 300 | 300 | 300 |
| Constitution (yarns/inch) | 18 | 18 | 18 | 18 | 18 |
| Weight (g/m²) | 57.6 | 57.6 | 57.6 | 57.6 | |
| Biaxially oriented PET film (one film) *3 | | | | | |
| Thickness (μm) | 12 | 12 | 12 | 12 | 12 |
| Adhesive (g/m²) Isocyanate crosslinked dry laminate | 25 | 5 | 10 | 50 | 25 |
| Laminate | | | | | |
| Thickness (mm) | 0.16 | 0.12 | 0.13 | 0.21 | 0.16 |
| Weight (g/m²) | 133 | 113 | 118 | 182 | 133 |

*1: non-twisted
*3: laminated on both surfaces

TABLE 12

| No. | | Ex. 18 | Ex. 26 | Ex. 27 | Ex. 28 | Ex. 29 |
|---|---|---|---|---|---|---|
| Tensile strength (kg/5cm) | Warp direction | 298 | 298 | 298 | 298 | 298 |
| | Weft direction | 85 | 85 | 85 | 85 | 107 |
| Tensile elongation (%) | Warp direction | 5.4 | 5.4 | 5.4 | 5.4 | 5.4 |
| | Weft direction | 13.5 | 13.5 | 13.5 | 13.5 | 5.4 |

TABLE 12-continued

| No. | | | Ex. 18 | Ex. 26 | Ex. 27 | Ex. 28 | Ex. 29 |
|---|---|---|---|---|---|---|---|
| Bias elongation in 45° direction (%) | Load (lbs) | 20 | 1.2 | 1.2 | 1.2 | 1.2 | 1.0 |
| | | 40 | 7.3 | 7.3 | 7.3 | 7.3 | 6.8 |
| | | 60 | 20.8 | 20.8 | 20.8 | 20.8 | 19.5 |
| | | 80 | 29.8 | 29.8 | 29.8 | 29.8 | 27.2 |
| | | 100 | 34.9 | 34.9 | 34.9 | 34.9 | 30.1 |
| Tearing strength (kg) | Warp direction | | 3.3 | 3.3 | 3.3 | 3.3 | 10.0 |
| | Weft direction | | ≧7 * | ≧7 * | ≧7 * | ≧7 * | 11.0 * |
| Adhesion strength (kg/inch) | Back | | ≧4 ** | 0.8 | 10.2 | ≧4 ** | ≧4 ** |
| | Face | | ≧4 ** | 0.65 | 8.5 | ≧4 ** | ≧4 ** |
| Flexibility (kg) | Warp direction | | 4.4 | 4.0 | 4.3 | 8.4 | 4.4 |
| | Weft direction | | 5.8 | 5.5 | 5.6 | 9.6 | 5.8 |
| Water absorption properties (mm) | Warp direction | | 11 | 23 | 13 | 5 | 11 |
| | Weft direction | | 0 | 18 | 2 | 0 | 0 |

* and **: The same as those in Table 2.

As shown in Tables 11 and 12, when the amount of the adhesive becomes smaller (Examples 26 and 27), the adhesion strength becomes low and water absorption is increased. In the case that the amount of the adhesion is too small, there are defects such as growth of fungi and the like, discoloration, etc. On the other hand, when the amount of the adhesive becomes larger (Example 29) the thickness and weight are increased. In the case that the amount of the adhesive is too large, the thickness and weight are increased unnecessarily. Further, flexibility and handling are deteriorated.

The laminate of Example 29 is substantially the same as that of Example 18 except that one KKS weft is used per two PET wefts and, by using KKS as the wefts, tearing strength in the warp direction can be considerably improved.

What is claimed is:

1. A water-resistant and high-strength laminate which comprises a base cloth of woven or knitted cloth obtained by weaving or knitting warps and wefts wherein at least a portion of warps and/or wefts is ultra-high-strength-polyethylene filaments and a majority of the rest is polyester fibers, at least one surface of said base cloth being laminated with a biaxially oriented polyester film through an adhesive layer.

2. The water-resistant and high-strength laminate according to claim 1, wherein said warps and/or wefts are not twisted.

3. The water-resistant and high-strength laminate according to claim 1, wherein monofilament denier of said warps and/or wefts is 0.5 to 20 denier.

4. The water-resistant and high-strength laminate according to claim 1, wherein total denier of said warps and/or wefts is 50 to 800 denier.

5. The water-resistant and high-strength laminate according to claim 1, wherein tensile strength of said warps and/or wefts containing ultra-high-strength-polyethylene filaments is not less than 15 g/denier.

6. The water-resistant and high-strength laminate according to claim 1, wherein weight of said woven or knitted cloth is 20 to 250 g/m$^2$.

7. The water-resistant and high-strength laminate according to claim 1, wherein thickness of said biaxially oriented polyester film is 12 to 125 μm.

* * * * *